United States Patent
Ito et al.

(10) Patent No.: US 10,724,777 B2
(45) Date of Patent: Jul. 28, 2020

(54) REFRIGERATION CYCLE APPARATUS CAPABLE OF PERFORMING REFRIGERANT RECOVERY OPERATION AND CONTROLLING BLOWER

(71) Applicant: Mitsubishi Electric Corporation, Tokyo (JP)

(72) Inventors: Masahiro Ito, Tokyo (JP); Takuya Ito, Tokyo (JP); Yasushi Okoshi, Tokyo (JP); Kazuyuki Ishida, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 33 days.

(21) Appl. No.: 15/754,615

(22) PCT Filed: Oct. 8, 2015

(86) PCT No.: PCT/JP2015/078657
§ 371 (c)(1),
(2) Date: Feb. 23, 2018

(87) PCT Pub. No.: WO2017/061010
PCT Pub. Date: Apr. 13, 2017

(65) Prior Publication Data
US 2019/0154322 A1    May 23, 2019

(51) Int. Cl.
*F25B 45/00*    (2006.01)
*F25B 47/02*    (2006.01)
(Continued)

(52) U.S. Cl.
CPC ............ *F25B 47/025* (2013.01); *F25B 13/00* (2013.01); *F25B 45/00* (2013.01); *F25B 49/022* (2013.01);
(Continued)

(58) Field of Classification Search
CPC ........ F25B 45/00; F25B 47/02; F25B 47/025; F25B 2400/16; F25B 2400/19;
(Continued)

(56) References Cited

U.S. PATENT DOCUMENTS

| 4,901,245 A | * | 2/1990 | Olson | .................. G01F 23/296 340/621 |
| 5,737,931 A | * | 4/1998 | Ueno | ...................... F25B 9/006 62/126 |

(Continued)

FOREIGN PATENT DOCUMENTS

| CN | 1320794 A | 11/2001 |
| CN | 102472540 A | 5/2012 |

(Continued)

OTHER PUBLICATIONS

Search Report dated Sep. 20, 2018 issued in corresponding EP patent application No. 15905829.6.
(Continued)

*Primary Examiner* — Edward F Landrum
*Assistant Examiner* — Daniel C Comings
(74) *Attorney, Agent, or Firm* — Posz Law Group, PLC

(57) ABSTRACT

A controller in a refrigeration cycle apparatus performs a refrigerant recovery operation when switching an operation mode from a defrosting mode to a heating mode. During the refrigerant recovery operation, by rotating a fan of a blower while monitoring a pressure at a discharge side of the compressor, the controller is configured to perform feedback control to cause a high-pressure side pressure to be close to a high-pressure side target pressure value. During the refrigerant recovery operation, by controlling a driving frequency of the compressor while monitoring a pressure at a suction side of the compressor, the controller is configured to perform feedback control to cause a low-pressure side
(Continued)

pressure to be close to a low-pressure side target pressure value.

10 Claims, 13 Drawing Sheets

(51) Int. Cl.
*F25B 13/00* (2006.01)
*F25B 49/02* (2006.01)

(52) U.S. Cl.
CPC . *F25B 2313/003* (2013.01); *F25B 2313/0294* (2013.01); *F25B 2400/16* (2013.01); *F25B 2400/19* (2013.01); *F25B 2400/23* (2013.01); *F25B 2500/28* (2013.01); *F25B 2600/02* (2013.01); *F25B 2600/0253* (2013.01); *F25B 2600/0271* (2013.01); *F25B 2600/0272* (2013.01); *F25B 2700/1931* (2013.01); *F25B 2700/1933* (2013.01); *F25B 2700/21151* (2013.01); *Y02B 30/741* (2013.01)

(58) Field of Classification Search
CPC ........ F25B 2400/2345; F25B 2400/001; F25B 2400/002; F25B 2400/003; F25B 2400/007
See application file for complete search history.

(56) References Cited

U.S. PATENT DOCUMENTS

| | | | |
|---|---|---|---|
| 5,782,101 A * | 7/1998 | Dennis | F25B 5/02 62/160 |
| 2002/0023448 A1 | 2/2002 | Ito et al. | |
| 2009/0158756 A1 * | 6/2009 | Brown | B60H 1/00585 62/77 |
| 2011/0308267 A1 * | 12/2011 | Tamaki | F25B 45/00 62/222 |
| 2012/0111042 A1 * | 5/2012 | Hamada | F25B 47/025 62/157 |
| 2014/0260368 A1 | 9/2014 | Wintemute et al. | |
| 2014/0311172 A1 * | 10/2014 | Iwasaki | F24F 1/06 62/151 |
| 2016/0116191 A1 | 4/2016 | Tamaki et al. | |

FOREIGN PATENT DOCUMENTS

| | | |
|---|---|---|
| JP | S56-050971 A | 5/1981 |
| JP | H06-026688 A | 2/1994 |
| JP | H09-138016 A | 5/1997 |
| JP | 2845786 B2 | 1/1999 |
| JP | H11-201572 A | 7/1999 |
| JP | 2002-106960 A | 4/2002 |
| JP | 2010-190545 A | 9/2010 |
| JP | 2012-207826 A | 10/2012 |
| JP | 2013-113498 A | 6/2013 |
| JP | 5401563 B2 | 11/2013 |
| JP | 2014-152943 A | 8/2014 |
| JP | 2015-087071 A | 5/2015 |
| WO | 2011/010473 A1 | 1/2011 |
| WO | 2014/188575 A1 | 11/2014 |

OTHER PUBLICATIONS

Office Action dated Oct. 23, 2018 issued in corresponding JP patent application No. 2017-544134 (and English translation).
International Search Report of the International Searching Authority dated Dec. 22, 2015 for the corresponding International application No. PCT/JP2015/078657 (and English translation).
Office Action dated May 7, 2019 issued in corresponding JP patent application No. 2017-544134 (and English translation).
Chinese Office Action dated Oct. 11, 2019 issued in corresponding JP patent application No. 201580083765.9 (and English translation).
European Office Action dated Apr. 23, 2020 issued in corresponding EP patent application No. 15 905 829.6.

* cited by examiner

REFRIGERATION CYCLE APPARATUS CAPABLE OF PERFORMING REFRIGERANT RECOVERY OPERATION AND CONTROLLING BLOWER

CROSS REFERENCE TO RELATED APPLICATION

This application is a U.S. national stage application of PCT/JP2015/078657 filed on Oct. 8, 2015, the contents of which are incorporated herein by reference.

TECHNICAL FIELD

The present invention relates to a refrigeration cycle apparatus capable of switching between a cooling mode and a heating mode in an operation.

BACKGROUND ART

Conventionally, there has been proposed a chilling unit in which a gas-liquid separator is provided at the suction side of a compressor and evaporated refrigerant is subjected to gas-liquid separation in the gas-liquid separator, is then suctioned to the compressor, and is compressed again (for example, see Japanese Patent No. 5401563 (Patent Document 1)).

CITATION LIST

Patent Document
PTD 1: Japanese Patent No. 5401563

SUMMARY OF INVENTION

Technical Problem

In a refrigeration cycle apparatus, refrigerant circulates in a flow path in order of a condenser, a decompressor, an evaporator, and a compressor. The refrigerant is liquefied in a heat exchanger serving as the condenser. The liquefied refrigerant (liquid refrigerant) is decompressed when passing through an expansion valve. The decompressed refrigerant is evaporated in a heat exchanger serving as the evaporator. The evaporated refrigerant (gas refrigerant) is suctioned to the compressor.

Suction of the liquid refrigerant to the compressor may cause failure of the compressor. The suction of the liquid refrigerant to the compressor may reduce operating efficiency of the refrigeration cycle. In order to avoid the liquid refrigerant from being suctioned to the compressor, there is also a refrigeration cycle apparatus configured to control the decompressor to cause a degree of superheat at the outlet side of the evaporator, i.e., the suction side of the compressor to be close to a target value.

In a refrigeration cycle apparatus capable of switching between a heating mode and a cooling mode in its operation, the heat exchanging capacity of a heat-source-side heat exchanger may be made larger than the heat exchanging capacity of a use-side heat exchanger in consideration of loads required in the cooling mode and the heating mode. In that case, an amount of refrigerant required for the heating mode in which the heat-source-side heat exchanger serves as the evaporator becomes smaller than an amount of refrigerant required for the cooling mode or defrosting mode in which the heat-source-side heat exchanger serves as the condenser. Hence, if the operation mode is switched from the cooling mode or defrosting mode to the heating mode without recovering the refrigerant, the refrigerant cannot be sufficiently evaporated in the evaporator, with the result that the liquid refrigerant is more likely to be suctioned to the compressor.

In the chilling unit described in Patent Document 1, the accumulator (gas-liquid separator) is provided at the suction side of the compressor, whereby the liquid refrigerant is suppressed from being suctioned to the compressor.

When the accumulator has a large volume, the gas-liquid separation of the refrigerant is sufficiently performed by the accumulator. Accordingly, by performing no refrigerant recovery operation or performing a refrigerant recovery operation for a short time after ending the defrosting mode, the liquid refrigerant can be suppressed from being suctioned to the compressor in the subsequent heating mode.

However, when the accumulator has a large volume, the refrigeration cycle apparatus also becomes large in size. A large-sized accumulator is not preferable due to a limited space on a rooftop or dedicated site in which the refrigeration cycle apparatus is installed.

By reducing the size of the accumulator, the refrigeration cycle apparatus can be reduced in size. In this case, performance of the gas-liquid-separation by the accumulator is decreased, with the result that a large amount of refrigerant needs to be recovered by performing the refrigerant recovery operation more stably for a longer time than that in the conventional case.

A purpose of the defrosting mode is to melt frost generated near the heat-source-side heat exchanger in the heating operation in the defrosting mode, the heat-source-side heat exchanger is operated as the condenser to generate heat to melt the frost. In the defrosting mode, it is not necessary to exchange heat between the refrigerant and air. Hence, a blower is normally not operated.

If the refrigerant recovery operation is performed without operating the blower as in the defrosting mode after completing the defrosting mode, the pressure at the discharge side (high-pressure side) of the compressor is increased. If the high-pressure side pressure is increased too much during the refrigerant recovery operation, the refrigerant recovery operation needs to be forcibly stopped in order to protect the refrigeration cycle apparatus.

If the refrigerant recovery operation is forcibly stopped, the refrigerant may not be sufficiently recovered. As a result, the liquid refrigerant is more likely to be suctioned to the compressor in the subsequent heating mode.

The present invention has been made to solve the problem described above, and has an object to provide a downsized refrigeration cycle apparatus.

Solution to Problem

A refrigeration cycle apparatus according to the present invention includes a first heat exchanger, a second heat exchanger, a compressor, a decompressor, a flow path switch, a blower, a refrigerant tank circuit, and a controller. The second heat exchanger has a capacity smaller than a capacity of the first heat exchanger. The flow path switch is configured to form a flow path in which refrigerant circulates in a first circulation direction in order of the first heat exchanger, the decompressor, the second heat exchanger, and the compressor, or in a second circulation direction reverse to the first circulation direction. The blower is configured to blow air to the first heat exchanger. The refrigerant tank circuit has a refrigerant tank and is connected to the flow path. The controller is configured to switch an operation mode including a heating mode and a defrosting mode. In the heating mode, the controller is configured to control the flow path switch to form the flow path in which the refrigerant circulates in the second circulation direction. In the defrosting mode, the controller is configured to control the flow path switch to form the flow path in which the refrigerant circulates in the first circulation direction and configured to control the refrigerant tank circuit to add the refrigerant from the refrigerant tank to the flow path. When switching the operation mode from the defrosting mode to the heating mode, the controller is configured to perform a refrigerant recovery operation to recover the refrigerant to the refrigerant tank while circulating the refrigerant in the first circulation direction, and configured to operate the blower during the refrigerant recovery operation.

Advantageous Effects of Invention

According to the present invention, by operating the blower to suppress increase of the pressure of the refrigerant at the high-pressure side during the refrigerant recovery operation, the refrigerant recovery operation can be performed for a longer time than that in the conventional case. Accordingly, the amount of recovery of the refrigerant can be increased. As a result, the accumulator becomes unnecessary or can be downsized, whereby the refrigeration cycle apparatus can be downsized.

DESCRIPTION OF EMBODIMENTS

Figure 1:
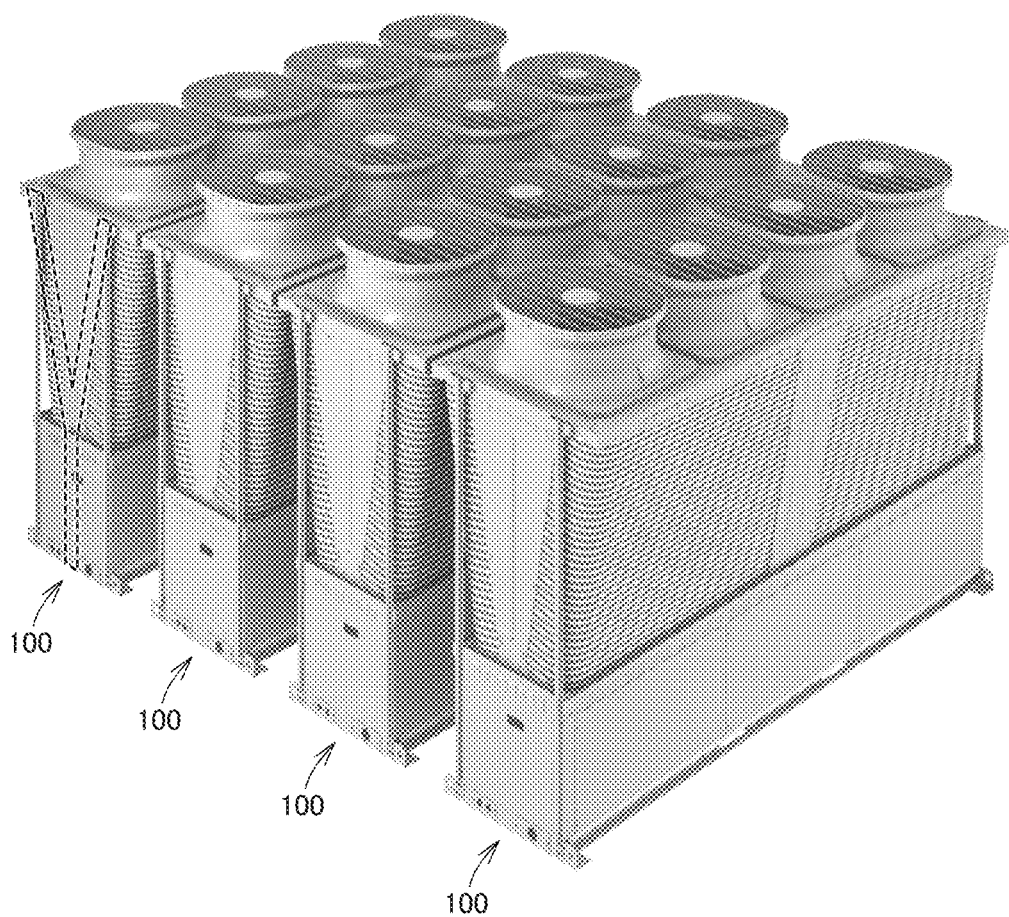
FIG. 1 is a perspective view showing that a plurality of air cooling type heat pump chillers 100 each including a refrigeration cycle apparatus according to a first embodiment are connected.

The following describes embodiments of the present invention in detail with reference to figures. It should be noted that the same or corresponding portions in the figures are given the same reference characters and are not described repeatedly.

First Embodiment

<Configuration of Refrigeration Cycle Apparatus>

FIG. 1 is a perspective view showing that a plurality of air cooling type heat pump chillers 100 each including a refrigeration cycle apparatus according to a first embodiment are connected. As shown in FIG. 1, each of air cooling type heat pump chillers 100 employs a Y-shaped structure as indicated by dotted lines in order to secure an air suction space and a maintenance space.

Figure 2:
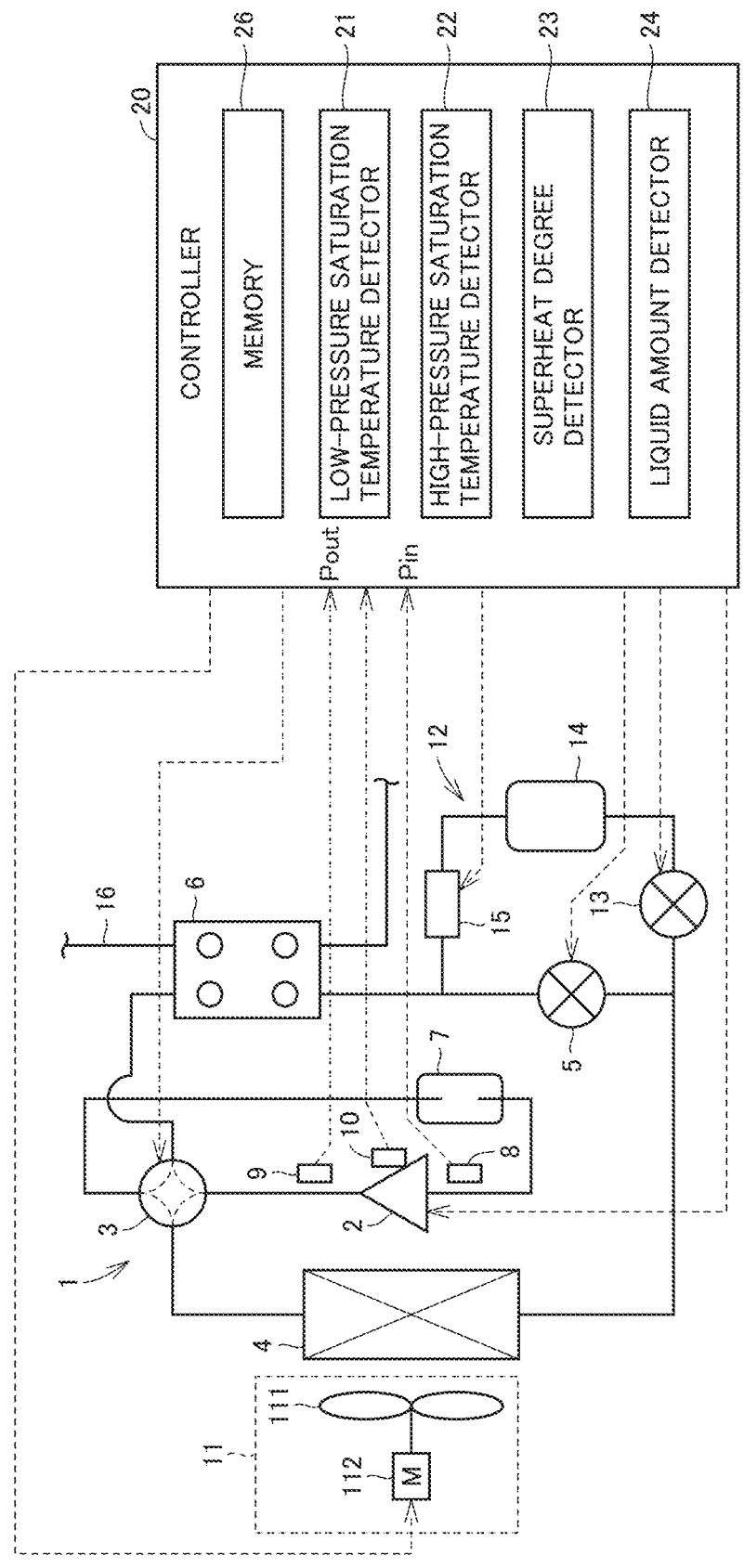
FIG. 2 shows both a circuit configuration diagram of the refrigeration cycle apparatus according to the first embodiment and a function block diagram of a controller.

FIG. 2 shows both a circuit configuration diagram of a refrigeration cycle apparatus 1 according to the first embodiment and a function block diagram of a controller 20. As shown in FIG. 2, refrigeration cycle apparatus 1 has a refrigeration circuit in which a compressor 2, a flow path switch 3 provided at the discharge side of compressor 2, a first heat exchanger 4, a first decompressor 5, a second heat exchanger 6, and an accumulator 7 are connected by a pipe. Inside this refrigeration circuit, refrigerant involving a phase change, such as carbon dioxide and R410A, circulates. Refrigeration cycle apparatus 1 illustrated in the first embodiment is configured to heat or cool water flowing in a water circuit 16 using second heat exchanger 6. The water flowing in water circuit 16 is used for indoor air conditioning, for example.

Compressor 2 is configured to suction and compress low-pressure refrigerant and discharge the refrigerant as high-pressure refrigerant. Compressor 2 is an inverter compressor variable in a discharge capacity for the refrigerant. An amount of the refrigerant circulating in refrigeration cycle apparatus 1 is controlled by adjusting the discharge capacity of compressor 2.

First decompressor 5 is configured to decompress the high-pressure refrigerant. Examples of first decompressor 5 usable herein include an apparatus having a valve body capable of adjusting a degree of opening, such as an electronic controlled type expansion valve.

Flow path switch 3 is configured to connect the discharge side of compressor 2 to first heat exchanger 4 and connect the suction side of compressor 2 to second heat exchanger 6 so as to form a first flow path in which the refrigerant discharged from compressor 2 flows to first heat exchanger 4. Flow path switch 3 is configured to connect the discharge side of compressor 2 to second heat exchanger 6 and connect the suction side of compressor 2 to first heat exchanger 4 so as to form a second flow path in which the refrigerant discharged from compressor 2 flows to second heat exchanger 6. Flow path switch 3 selectively performs the operation of forming the first flow path and the operation of forming the second flow path. Flow path switch 3 is an apparatus that has a valve body provided at the pipe in which the refrigerant flows and that is configured to switch between the above-described refrigerant flow paths by switching this valve body between open and close states. Flow path switch 3 is also referred to as a "four-way valve".

First heat exchanger 4 is a refrigerant-air heat exchanger having a flow path in which the refrigerant flows. In first heat exchanger 4, heat is exchanged between the refrigerant flowing in the flow path and air external to the flow path. A blower 11 is provided near first heat exchanger 4 and air from blower 11 facilitates heat exchange in first heat exchanger 4. Blower 11 includes a fan 111 and a motor 112 configured to rotate fan 111. Blower 11 is a blower variable in rotating speed, for example. An amount of heat absorption of the refrigerant in first heat exchanger 4 is adjusted by adjusting the rotating speed of motor 112.

Second heat exchanger 6 is a refrigerant-water heat exchanger having a flow path in which the refrigerant flows and a flow path in which the water of water circuit 16 flows. In second heat exchanger 6, heat is exchanged between the refrigerant and the water.

Refrigeration cycle apparatus 1 is capable of switching between cooling and heating in the operation thereof. In the cooling mode, flow path switch 3 is configured to connect the discharge side of compressor 2 to first heat exchanger 4 so as to form the first flow path in which the refrigerant discharged from compressor 2 flows to first heat exchanger 4. The refrigerant circulates in the first flow path in a first circulation direction in order of first heat exchanger 4, first decompressor 5, second heat exchanger 6, and compressor 2. First heat exchanger 4 serves as a condenser and second heat exchanger 6 serves as an evaporator.

In the heating mode, flow path switch 3 is configured to connect the discharge side of compressor 2 to second heat exchanger 6 so as to form the second flow path in which the refrigerant discharged from compressor 2 flows to second heat exchanger 6. The refrigerant circulates in the second flow path in the second circulation direction reverse to the first circulation direction. First heat exchanger 4 serves as an evaporator and second heat exchanger 6 serves as a condenser. First heat exchanger 4 serves as a heat-source-side heat exchanger. Second heat exchanger 6 serves as a use-side heat exchanger. In consideration of loads required for the cooling mode and the heating mode, the heat exchanging capacity of second heat exchanger 6 is smaller than the heat exchanging capacity of first heat exchanger 4.

Accumulator 7 is a container configured to store the refrigerant therein, and is installed at the suction side of compressor 2. Accumulator 7 has an upper portion connected to a pipe via which the refrigerant flows in and has a lower portion connected to a pipe via which the refrigerant flows out. Gas-liquid separation of the refrigerant is performed in accumulator 7. The gas refrigerant resulting from the gas-liquid separation is suctioned to compressor 2.

At an inlet of compressor 2, a suction pressure sensor 8 is provided to detect a pressure Pin of the refrigerant suctioned to compressor 2, i.e., the refrigerant at the low-pressure side. Suction pressure sensor 8 is provided at a location at which pressure Pin of the refrigerant at the low-pressure side can be detected. The illustrated location of suction pressure sensor 8 is exemplary.

At the outlet of compressor 2, a first discharge pressure sensor 9 is provided to detect a pressure Pout of the refrigerant discharged from compressor 2, i.e., the refrigerant at the high-pressure side. First discharge pressure sensor 9 is provided at a location at which pressure Pout of the refrigerant at the high-pressure side can be detected. The illustrated location of first discharge pressure sensor 9 is exemplary.

At the inlet of compressor 2, a suction temperature sensor 10 is provided to detect a temperature of the refrigerant suctioned by compressor 2, i.e., the refrigerant at the low-pressure side. Suction temperature sensor 10 is provided at a location at which the temperature of the refrigerant at the low-pressure side can be detected. The illustrated location of suction temperature sensor 10 is exemplary. Suction temperature sensor 10 is provided at a lower portion of a shell of compressor 2 or the pipe at the inlet side of accumulator 7, for example.

Refrigeration cycle apparatus 1 is provided with a refrigerant tank circuit 12. Refrigerant tank circuit 12 is a circuit connected between first heat exchanger 4 and first decompressor 5 and between first decompressor 5 and second heat exchanger 6. Refrigerant tank circuit 12 is a circuit provided in parallel with first decompressor 5. In refrigerant tank circuit 12, a second decompressor 13, a refrigerant tank 14, and a valve 15 are connected in series in this order from the side closest to first heat exchanger 4. It should be noted that for ease of description, among the circuits in refrigeration cycle apparatus 1 and except refrigerant tank circuit 12, a circuit in which compressor 2, first heat exchanger 4, first decompressor 5, and second heat exchanger 6 are connected may be referred to as a "main circuit".

Second decompressor 13 is configured to decompress the high-pressure refrigerant. Examples of second decompressor 13 usable herein include an apparatus having a valve body capable of adjusting a degree of opening, such as an electronic controlled type expansion valve.

Refrigerant tank 14 is a container configured to store the refrigerant therein.

Valve 15 has a valve body provided at a pipe of refrigerant tank circuit 12 and this valve body is switched between open and close states to switch between supply and non-supply states of the refrigerant.

Controller 20 is configured to generally control refrigeration cycle apparatus 1. Controller 20 is configured to receive pressure Pin detected by suction pressure sensor 8, pressure Pout detected by first discharge pressure sensor 9, and the temperature detected by suction temperature sensor 10. Controller 20 is configured to control compressor 2, flow path switch 3, first decompressor 5, second decompressor 13, valve 15, and blower 11.

Controller 20 has a low-pressure saturation temperature detector 21, a high-pressure saturation temperature detector 22, a superheat degree detector 23, and a liquid amount detector 24 as functional blocks. Moreover, controller 20 has a memory 26.

In accordance with pressure Pin of the low-pressure refrigerant detected by suction pressure sensor 8 and a conversion table of saturation temperatures under various pressures in memory 26, low-pressure saturation temperature detector 21 is configured to detect a low-pressure saturation temperature, which is a saturation temperature of the low-pressure refrigerant at the suction side of compressor 2.

In accordance with pressure Pout of the high-pressure refrigerant detected by first discharge pressure sensor 9 and the conversion table of the saturation temperatures under various pressures in memory 26, high-pressure saturation temperature detector 22 is configured to detect a high-pressure saturation temperature, which is a saturation temperature of the high-pressure refrigerant at the discharge side of compressor 2.

In accordance with the pressure of the refrigerant at the suction side of compressor 2 detected by suction pressure sensor 8 and the conversion table of the saturation temperatures under various pressures in memory 26, superheat degree detector 23 is configured to detect the saturation temperature of the refrigerant at the suction side. Further, superheat degree detector 23 is configured to detect a degree of superheat at the inlet of compressor 2 by determining a difference between the detected saturation temperature and the refrigerant temperature at the inlet of compressor 2 detected by suction temperature sensor 10.

Liquid amount detector 24 is configured to detect a liquid amount in refrigerant tank 14 based on the degree of superheat at the inlet of compressor 2 detected by superheat degree detector 23 and a reference degree of superheat stored in memory 26 and representing a case where refrigerant tank 14 is in a liquid-filled state.

Controller 20 includes a CPU (Central Processing Unit; also referred to as a "processing device", a "calculation device", a "microprocessor", a "microcomputer", and a "processor") configured to execute a program stored in memory 26.

When controller 20 is a CPU, each of functions performed by controller 20 is implemented by software, firmware or a combination of the software and firmware. The software and firmware are written as a program and are stored in memory 26. The CPU reads and executes the program stored in memory 26, thereby implementing each function of controller 20. Here, memory 26 is a nonvolatile or volatile semiconductor memory, such as a RAM, a ROM, a flash memory, an EPROM, and an EEPROM, for example.

Part of low-pressure saturation temperature detector 21, high-pressure saturation temperature detector 22, superheat degree detector 23, and liquid amount detector 24 of controller 20 may be implemented by dedicated hardware, and the other part thereof may be implemented by software or firmware. When implemented by hardware, a single circuit, a composite circuit, an ASIC, a FPGA, or a combination thereof is used, for example.

Figure 3:
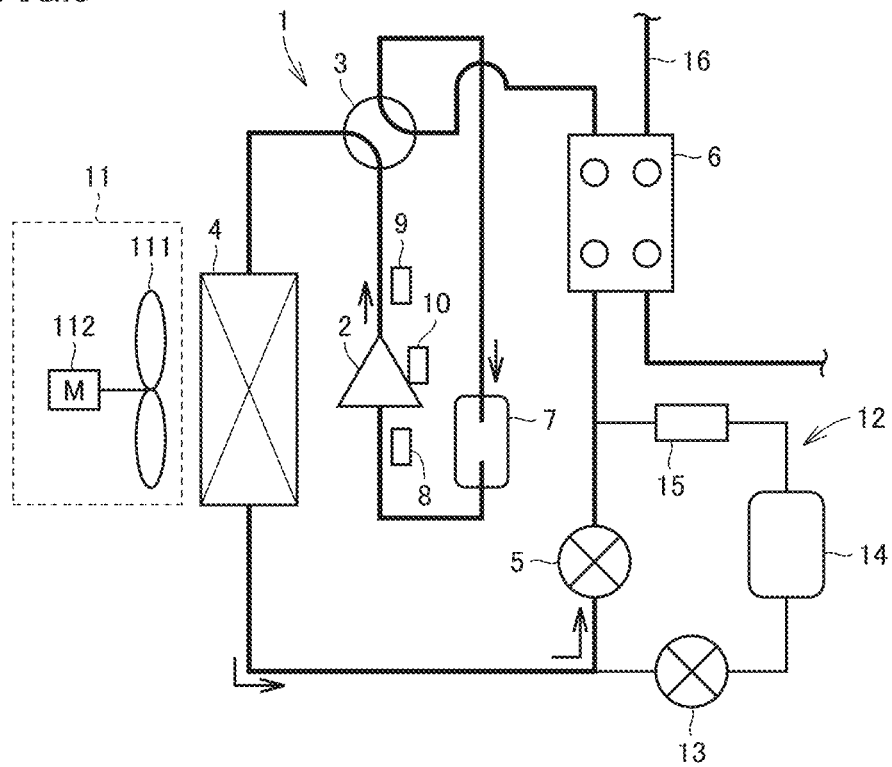
FIG. 3 is a circuit configuration diagram showing a state of a cooling mode of the refrigeration cycle apparatus.
Figure 4:
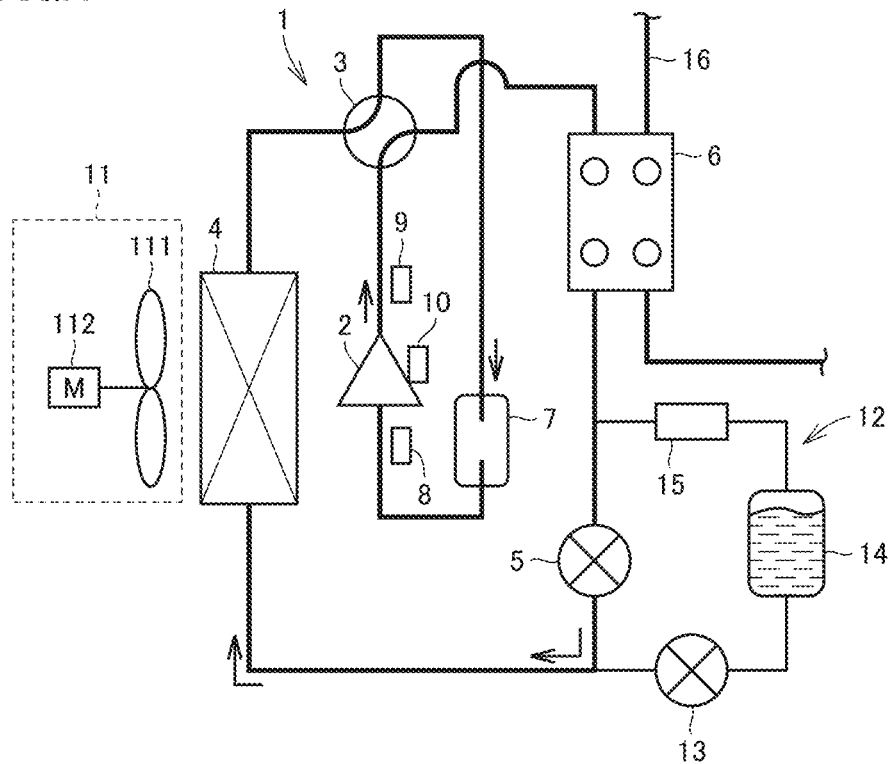
FIG. 4 is a circuit configuration diagram showing a state of a heating mode of the refrigeration cycle apparatus.

FIG. 3 is a circuit configuration diagram showing a state of refrigeration cycle apparatus 1 in the cooling mode according to the first embodiment. FIG. 4 is a circuit configuration diagram showing a state of refrigeration cycle apparatus 1 in the heating mode according to the first embodiment. In each of FIG. 3 and FIG. 4, the path in which the refrigerant flows is represented by a thick line and a direction in which the refrigerant flows is represented by arrows.

<Cooling Mode>

With reference to FIG. 3, the following describes a flow of the refrigerant in the cooling mode. The high-temperature high-pressure refrigerant discharged from compressor 2 flows into first heat exchanger 4 via flow path switch 3. In first heat exchanger 4, the high-temperature high-pressure refrigerant is decreased in temperature as a result of heat exchange with air blown from blower 11, and flows out from first heat exchanger 4. The refrigerant flowing out from first heat exchanger 4 is decompressed by first decompressor 5 to become low-temperature low-pressure refrigerant, and then flows into second heat exchanger 6. In second heat exchanger 6, the low-temperature low-pressure refrigerant is increased in temperature as a result of heat exchange with the water flowing in water circuit 16, and flows out from second heat exchanger 6. The refrigerant flowing out from second heat exchanger 6 flows into accumulator 7 via flow path switch 3, and is subjected to gas-liquid separation in accumulator 7. The gas refrigerant in accumulator 7 is suctioned to compressor 2.

In the cooling mode, the water flowing in water circuit 16 is cooled by the refrigerant flowing in second heat exchanger 6, which is the use-side heat exchanger. This cooled water is used for indoor cooling, for example.

An optimal amount of the refrigerant during a rated operation in the cooling mode is larger than an optimal amount of the refrigerant during a rated operation in the heating mode. Hence, during the cooling mode, the refrigerant is configured not to be stored in refrigerant tank 14, and all the amount of the refrigerant is configured to circulate in refrigeration cycle apparatus 1. During the cooling mode, second decompressor 13 and valve 15 are in the fully close state or substantially fully close state. The refrigerant does not flow into refrigerant tank circuit 12.

<Heating Mode>

With reference to FIG. 4, the following describes a flow of the refrigerant in the heating mode. The high-temperature high-pressure refrigerant discharged from compressor 2 flows into second heat exchanger 6 via flow path switch 3. In second heat exchanger 6, the high-temperature high-pressure refrigerant is decreased in temperature as a result of heat exchange with the water flowing in water circuit 16, and flows out from second heat exchanger 6. The refrigerant flowing out from second heat exchanger 6 is decompressed by first decompressor 5 to become low-temperature low-pressure refrigerant, and then flows into first heat exchanger 4. In first heat exchanger 4, the low-temperature low-pressure refrigerant is increased in temperature as a result of heat exchange with air blown from blower 11, and flows out from first heat exchanger 4. The refrigerant flowing out from first heat exchanger 4 flows into accumulator 7 via flow path switch 3, and is subjected to gas-liquid separation in accumulator 7. The gas refrigerant in accumulator 7 is suctioned to compressor 2.

In the heating mode, the water flowing in water circuit 16 is heated by the refrigerant flowing in second heat exchanger 6 serving as the use-side heat exchanger, and this heated water is used for indoor heating, for example.

In the heating mode, second decompressor 13 is in the fully close state or substantially fully close state and valve 15 is in the fully open state. An optimal amount of the refrigerant during a rated operation in the heating mode is smaller than an optimal amount of the refrigerant during a rated operation in the cooling mode. Hence, an excess of the refrigerant in the heating mode is stored in refrigerant tank 14, and the amount of the refrigerant circulating in the main circuit in the heating mode is smaller than the amount of the refrigerant circulating in the main circuit in the cooling mode.

In both the cooling mode and the heating mode, controller 20 is configured to control first decompressor 5 for a degree of superheat. More specifically, superheat degree detector 23 of controller 20 is configured to detect a degree of superheat of the refrigerant at the outlet side of the heat exchanger serving as the condenser, i.e., the suction side of compressor 2. Controller 20 is configured to control a degree of opening of first decompressor 5 to obtain a detected degree of superheat close to a target value.

<Defrosting Mode>

During the operation in the heating mode, frost may be adhered to an outer surface of the pipe of first heat exchanger 4 serving as the evaporator. Hence, in order to melt the adhered frost, refrigeration cycle apparatus 1 is operated in the defrosting mode. In the defrosting mode, as with the cooling mode, the discharge side of compressor 2 is connected to first heat exchanger 4 by flow path switch 3 to cause the refrigerant to circulate in the second flow path in the second circulation direction. The high-temperature refrigerant discharged from compressor 2 flows into first heat exchanger 4 and melts the frost. In the defrosting mode, the low-temperature refrigerant flows into second heat exchanger 6 serving as the use-side heat exchanger. Hence, it is desirable to complete the defrosting as short as possible in time.

Since the optimal amount of the refrigerant in the cooling mode is different from the optimal amount of the refrigerant in the heating mode as described above, refrigeration cycle apparatus 1 is operated with the excess of the refrigerant being stored in refrigerant tank 14 in the heating mode.

Figure 5:
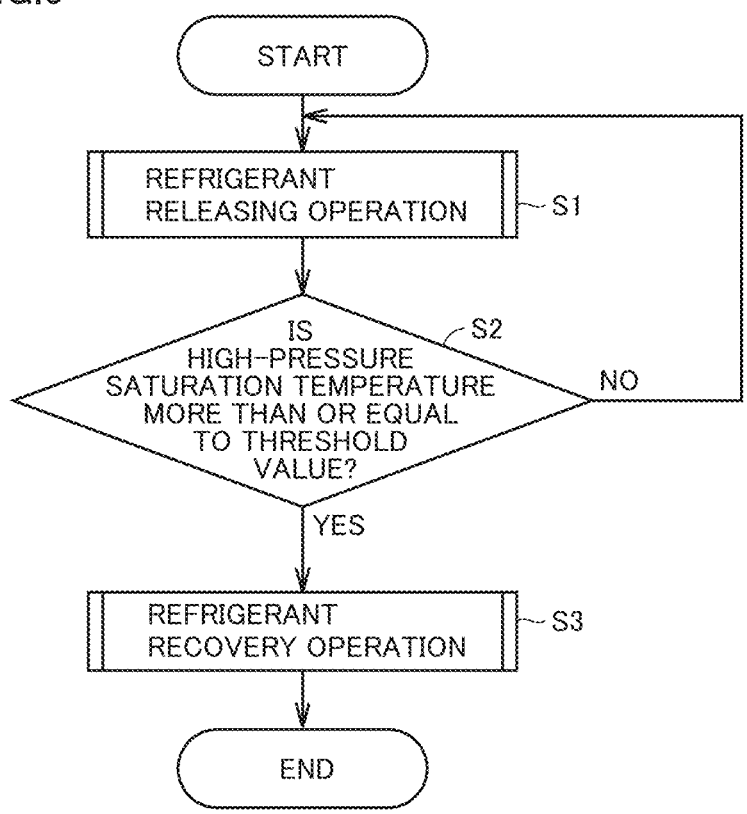
FIG. 5 is a flowchart illustrating a flow of a defrosting mode.

FIG. 5 is a flowchart illustrating a flow of the defrosting mode according to the first embodiment. As shown in FIG. 5, when the defrosting mode is started, controller 20 performs a refrigerant releasing operation in a step S1 by opening one of second decompressor 13 and valve 15 to discharge the refrigerant from refrigerant tank 14, and the process proceeds to a step S2. During the refrigerant releasing operation, the refrigerant discharged from compressor 2 flows to first heat exchanger 4.

In S2, controller 20 determines whether the high-pressure saturation temperature is more than or equal to a threshold value. When the high-pressure saturation temperature is less than the threshold value (NO in S2), controller 20 determines that the defrosting is not completed and the process is returned to S1. When the high-pressure saturation temperature is more than or equal to the threshold value (YES in S2), controller 20 determines that the defrosting is completed and the process proceeds to a step S3.

In S3, controller 20 performs a refrigerant recovery operation to recover the refrigerant into refrigerant tank 14 by opening both second decompressor 13 and valve 15. Controller 20 ends the process after completing the refrigerant recovery, and returns the operation mode of refrigeration cycle apparatus 1 to the heating mode.

A purpose of the defrosting mode is to melt frost generated near first heat exchanger 4 in the heating operation. In the defrosting mode, first heat exchanger 4 is operated as a condenser to generate heat to melt the frost. In the defrosting mode, it is not necessary to exchange heat between the refrigerant and air. Normally, fan 111 of blower 11 is not rotated.

If the refrigerant recovery operation is performed without rotating fan 111 after completing the defrosting mode, the pressure at the discharge side (high-pressure side) of compressor 2 may be increased. If the pressure is increased too much, failure may be more likely to occur. Hence, the refrigerant recovery operation needs to be forcibly stopped.

Moreover, if the driving frequency in the defrosting mode is set at a constant value during the refrigerant recovery operation performed after ending the defrosting mode, the low-pressure side pressure may be decreased to result in a decreased temperature of the refrigerant. As a result, the temperature of the water flowing in water circuit 16 is decreased, with the result that the water is more likely to be frozen. If the low-pressure side pressure is decreased too much, the refrigerant recovery operation needs to be forcibly stopped.

If the refrigerant recovery operation is forcibly stopped, the refrigerant may not be sufficiently recovered. As a result, the liquid refrigerant is more likely to be suctioned to the compressor in the subsequent heating mode.

In view of such a problem, in the first embodiment, during the refrigerant recovery operation, controller 20 is configured to cause the high-pressure side pressure to be close to a high-pressure side target pressure value P2 by performing feedback control of an amount of air blown from blower 11 while monitoring the high-pressure side pressure. That is, in the first embodiment, controller 20 is configured to rotate fan 111 of blower 11 during the refrigerant recovery operation. Moreover, controller 20 is configured to cause the low-pressure side pressure to be close to a low-pressure side target pressure value P1 by performing feedback control of the driving frequency of compressor 2 while monitoring the low-pressure side pressure. By performing such feedback control, the refrigerant recovery operation can be stably continued.

Figure 6:
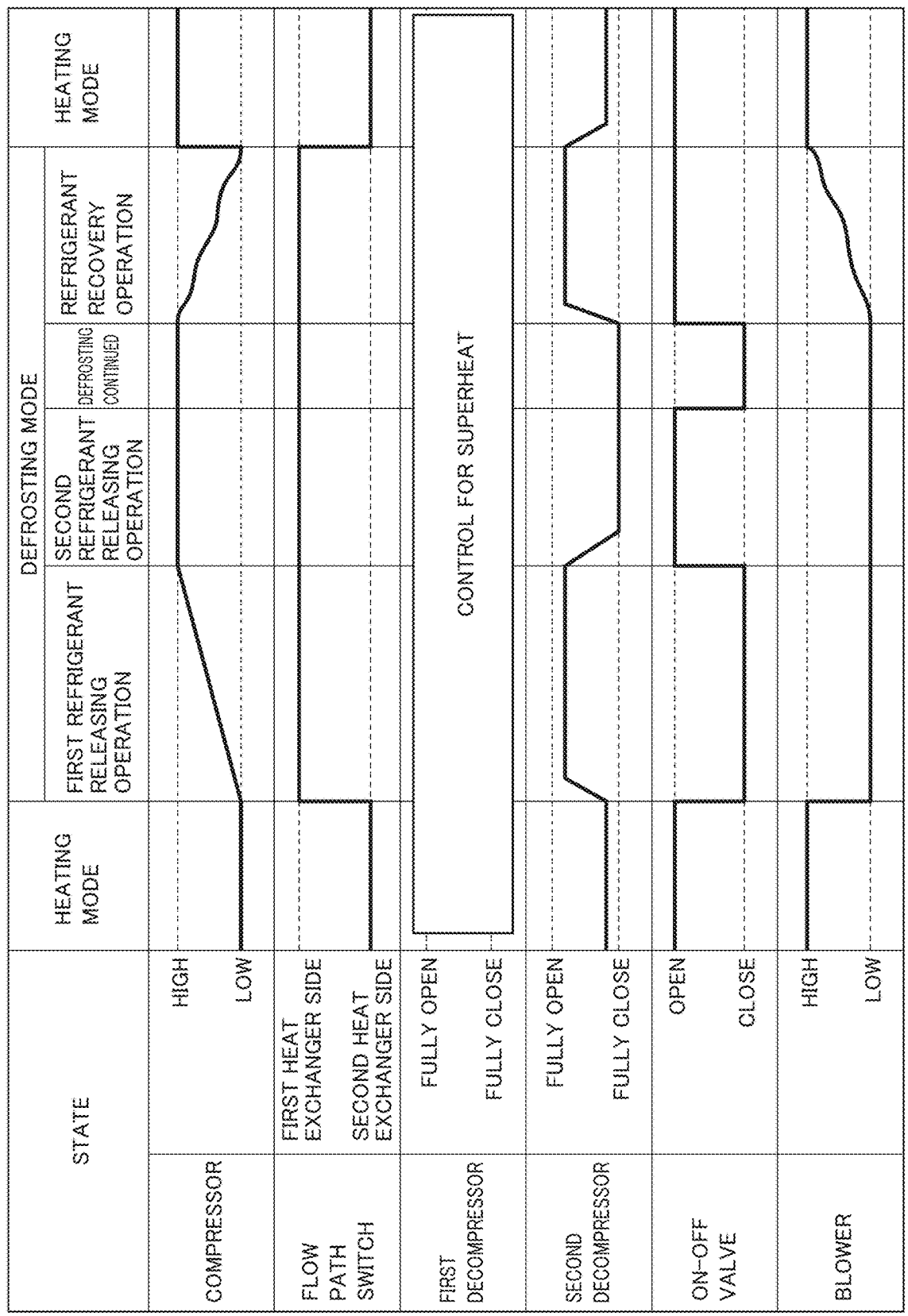
FIG. 6 is a timing chart illustrating an operation of each configuration of the refrigeration cycle apparatus in a defrosting mode.
Figure 7:
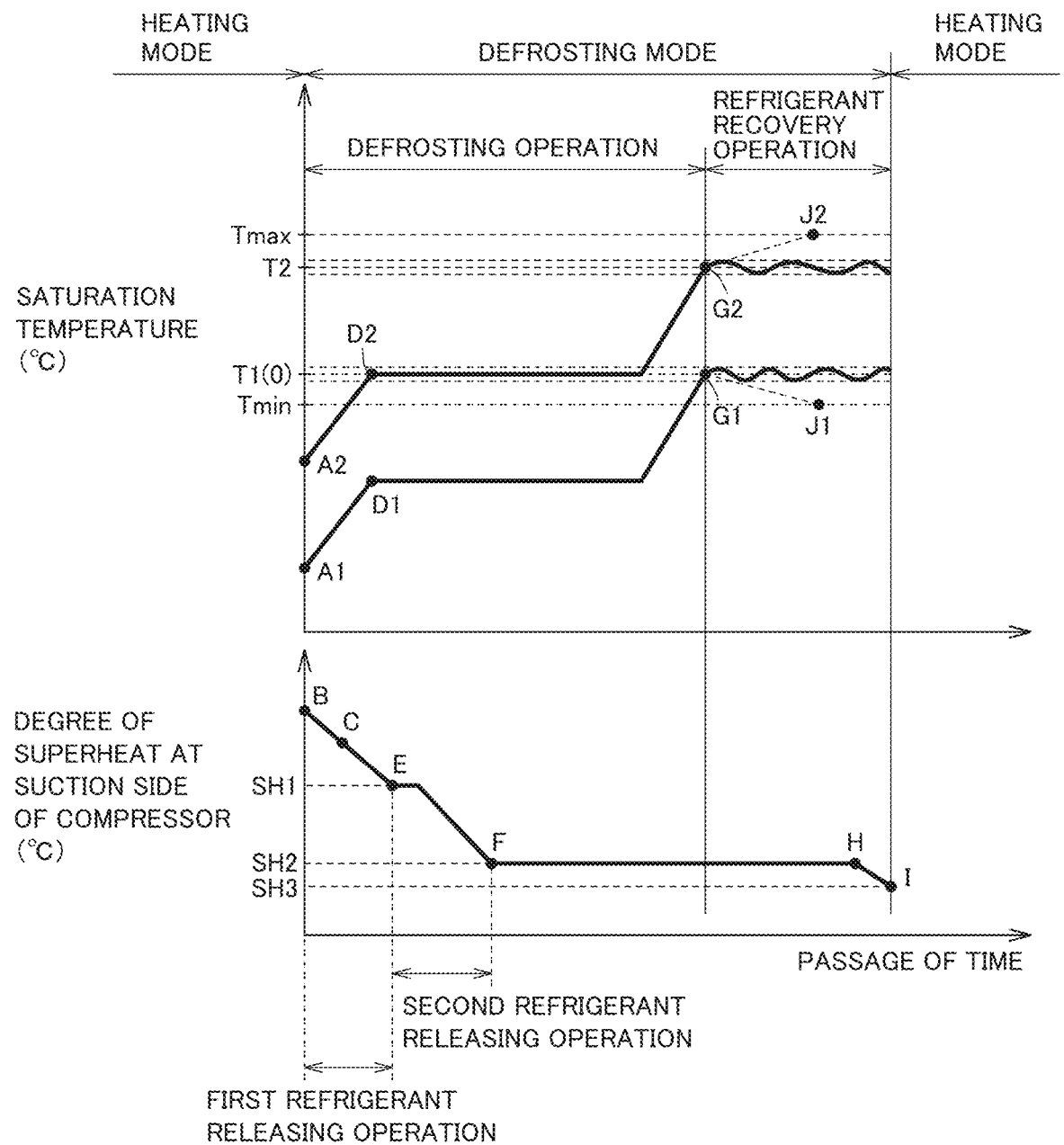
FIG. 7 illustrates changes in high-pressure saturation temperature and low-pressure saturation temperature in the defrosting mode in the first embodiment.
Figure 8:
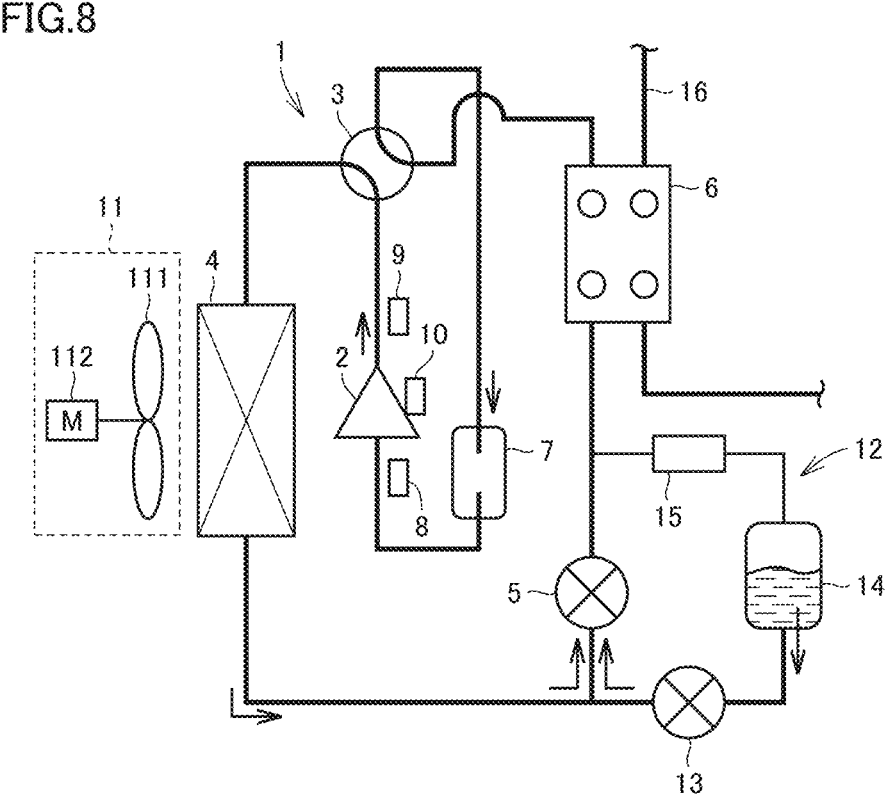
FIG. 8 is a circuit configuration diagram of the refrigeration cycle apparatus and shows a state of a first refrigerant releasing operation in the defrosting mode.
Figure 9:
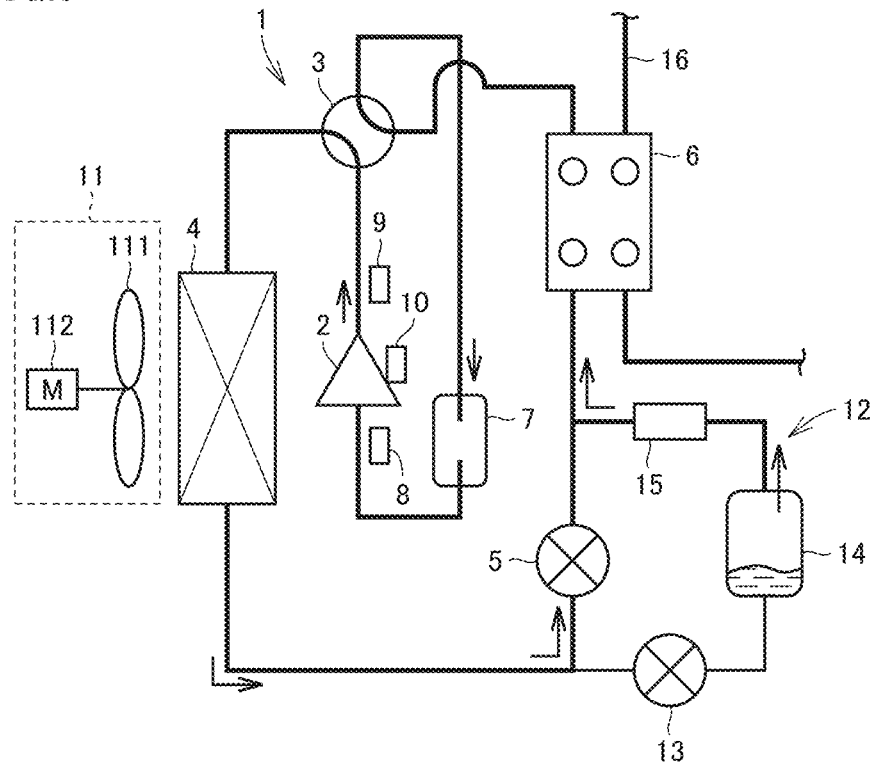
FIG. 9 is a circuit configuration diagram of the refrigeration cycle apparatus and shows a state of a second refrigerant releasing operation in the defrosting mode.
Figure 10:
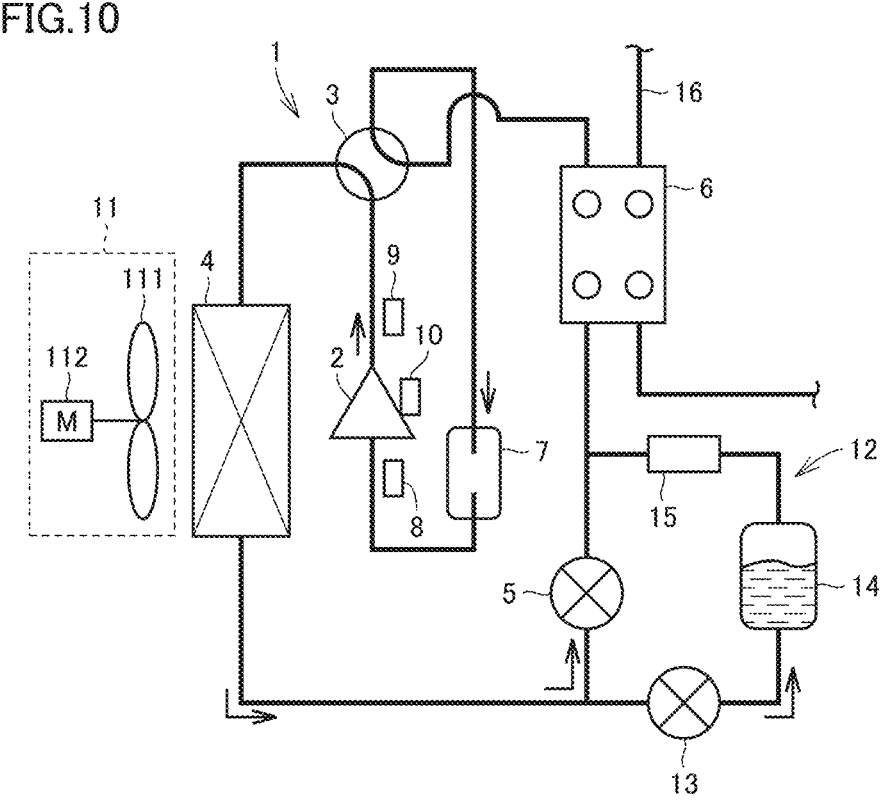
FIG. 10 is a circuit configuration diagram of the refrigeration cycle apparatus and shows a state of the refrigerant recovery operation in the defrosting mode.
Figure 11:
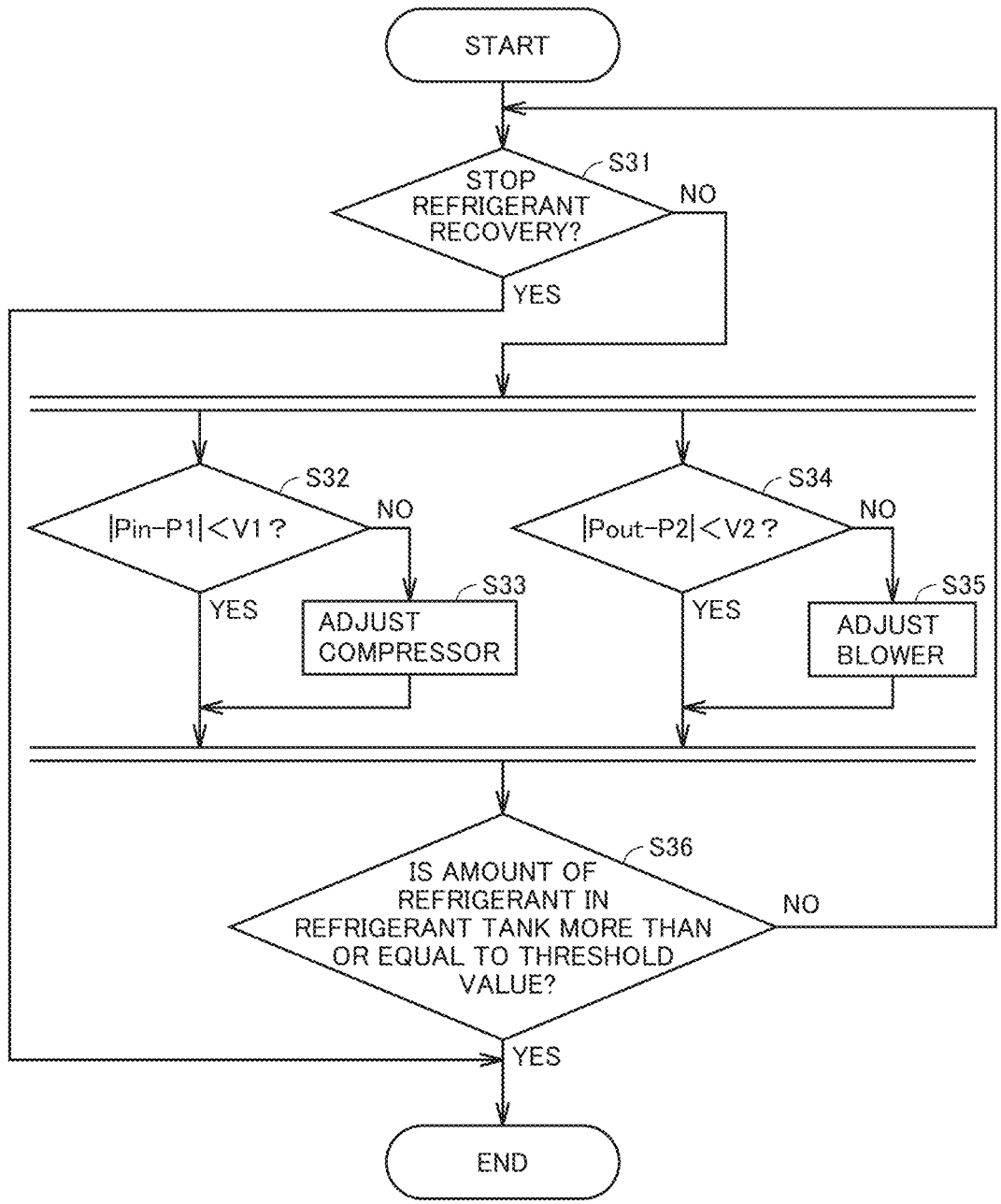
FIG. 11 is a flowchart for illustrating feedback control performed by the controller during the refrigerant recovery operation in the first embodiment.

FIG. 6 is a timing chart illustrating an operation of each configuration of refrigeration cycle apparatus 1 in the defrosting mode. The state of the "flow path switch" in FIG. 6 indicates which one of first heat exchanger 4 and second heat exchanger 6 the outlet of compressor 2 is connected to. FIG. 7 illustrates changes in the high-pressure saturation temperature and the low-pressure saturation temperature in the defrosting mode. In the graph of FIG. 7, the horizontal axis represents passage of time. FIG. 8 is a circuit configuration diagram of refrigeration cycle apparatus 1 and shows a state of the first refrigerant releasing operation in the defrosting mode. FIG. 9 is a circuit configuration diagram of refrigeration cycle apparatus 1, and shows a state of the second refrigerant releasing operation in the defrosting mode. FIG. 10 is a circuit configuration diagram of refrigeration cycle apparatus 1, and shows a state of the refrigerant recovery operation in the defrosting mode. FIG. 11 is a flowchart for illustrating the feedback control performed by controller 20 during the refrigerant recovery operation in the first embodiment. The following describes the operation in the defrosting mode in the first embodiment with reference to FIG. 6 as well as FIG. 7 to FIG. 11 as required.

As shown in FIG. 6, during the heating mode, compressor 2 is operated at a driving frequency determined based on an air conditioning load. The discharge side of compressor 2 is connected to second heat exchanger 6 by flow path switch 3. First decompressor 5 has a degree of opening resulting from the control for the degree of superheat. Second decompressor 13 of refrigerant tank circuit 12 is in the fully close state or substantially fully close state. Valve 15 is in the open state. The states of second decompressor 13 and valve 15 are not limited to the example of FIG. 6 as long as refrigerant tank 14 can be maintained to be in the liquid-filled state in the heating mode. Refrigeration cycle apparatus 1 during the heating mode is as shown in FIG. 4.

<Defrosting Mode—First Refrigerant Releasing Operation>

When the defrosting mode is started, refrigeration cycle apparatus 1 first performs a first refrigerant releasing operation. In the first refrigerant releasing operation, the discharge side of compressor 2 is connected to first heat exchanger 4 by flow path switch 3, second decompressor 13 is controlled to be in the open state, and valve 15 is controlled to be in the close state. The degree of opening of second decompressor 13 may be a fully open state or may be a degree of opening slightly lower than the fully open state in order to suppress the liquid refrigerant from being suctioned to compressor 2. It should be noted that first decompressor 5 is controlled for the degree of superheat also during the defrosting mode. In the example of FIG. 6, the driving frequency of compressor 2 is increased in order to improve defrosting performance;

however, the control over the performance of compressor 2 is not limited in the present invention.

As indicated by a point A2 in FIG. 7, when the first refrigerant releasing operation is started, the high/low pressures are reversed due to the switching of the flow paths by flow path switch 3. Hence, the high-pressure saturation temperature is low. As indicated by a point A1 in FIG. 7, the low-pressure saturation temperature is also low as the high-pressure saturation temperature is low, but a pressure difference therebetween is low because the temperature of the water of water circuit 16 flowing in second heat exchanger 6 is high due to the operation in the heating mode before the start of the defrosting mode. Hence, as indicated by a point B, the degree of superheat at the inlet of compressor 2 is large.

By closing valve 15 and opening second decompressor 13 of refrigerant tank circuit 12 as shown in FIG. 8, refrigerant tank 14 is connected to the high-pressure side of the main circuit. Since the main circuit is in a state immediately after the low and high pressures are reversed and the pressure in refrigerant tank 14 having been connected to the high-pressure side in the heating mode immediately before is relatively high, the liquid refrigerant is released from refrigerant tank 14. Accordingly, as indicated by a period of point B to a point C in FIG. 7, the degree of superheat at the suction side of compressor 2 is decreased rapidly. Moreover, as indicated by a point D2 in FIG. 7, as the first refrigerant releasing operation is continued, the high-pressure saturation temperature is increased to a melting temperature (0° C.) for the frost. The refrigerant stored in refrigerant tank 14 also circulates in the main circuit, thereby increasing the defrosting performance of refrigeration cycle apparatus 1.

When the degree of superheat at the suction side of compressor 2 is decreased to a threshold value SH1, which is a threshold value for determining to end the liquid release, as indicated by a point E in FIG. 7, controller 20 determines that the release of the refrigerant in refrigerant tank 14 is completed and ends the first refrigerant releasing operation. When the first refrigerant releasing operation is ended, controller 20 brings second decompressor 13 into the close state as shown in FIG. 6.

<Defrosting Mode—Second Refrigerant Releasing Operation>

Since the refrigerant is released from refrigerant tank 14 to the high-pressure side of the main circuit in the first refrigerant releasing operation, the liquid refrigerant is suppressed from being suctioned to the compressor as compared with a case where the refrigerant is released to the low-pressure side. However, when the pressure in refrigerant tank 14 becomes equal to the high-pressure side pressure, the refrigerant can remain in refrigerant tank 14. Hence, a second refrigerant releasing operation for releasing the refrigerant remaining in refrigerant tank 14 is performed to further improve the defrosting performance.

As shown in FIG. 6, in the second refrigerant releasing operation, second decompressor 13 is controlled to be in the close state and valve 15 is controlled to be in the open state. It should be noted that in the example of FIG. 6, compressor 2 is maintained to have a high driving frequency, however, the control over the performance of compressor 2 is not limited in the present invention. Moreover, the control of first decompressor 5 for the degree of superheat is continued.

By opening valve 15 and closing second decompressor 13 of refrigerant tank circuit 12 as shown in FIG. 9, refrigerant tank 14 is connected to the low-pressure side of the main circuit. Due to a pressure difference between the inside of refrigerant tank 14 and a downstream of valve 15 (downstream of first decompressor 5), the refrigerant remaining in refrigerant tank 14 is released.

As shown in FIG. 7, when the second refrigerant releasing operation is started, the refrigerant remaining in refrigerant tank 14 is released, with the result that the degree of superheat at the suction side of compressor 2 starts to be decreased. When the degree of superheat at the suction side of compressor 2 is decreased to a threshold value SH2, which is a threshold value for determining to end the liquid release, as indicated by a point F in FIG. 7, controller 20 determines that the release of the refrigerant in refrigerant tank 14 is completed and ends the second refrigerant releasing operation. When the second refrigerant releasing operation is ended, controller 20 brings valve 15 into the close state.

<Defrosting Mode—Defrosting Continuing Operation>

When the release of the refrigerant from refrigerant tank 14 is ended, a defrosting continuing operation is performed. As shown in FIG. 6, in the defrosting continuing operation, second decompressor 13 and valve 15 are controlled to be in the close state. For compressor 2 and first decompressor 5, the control in the second refrigerant releasing operation is continued.

As a result of the operation in the defrosting mode, the frost adhered to first heat exchanger 4 is melted to increase the high-pressure saturation temperature and the low-pressure saturation temperature as shown in FIG. 7. As indicated by a point G2 in FIG. 6, when the high-pressure saturation temperature reaches a target temperature value T2, which is a threshold value for determining to end the defrosting, controller 20 determines that the defrosting is completed and ends the defrosting continuing operation. It may be determined that the defrosting is completed when the low-pressure saturation temperature reaches a target temperature value T1. Target temperature values T1, T2 are saturation temperatures corresponding to low-pressure side target pressure value P1 and high-pressure side target pressure value P2, respectively.

<Defrosting Mode—Refrigerant Recovery Operation>

In the defrosting mode, the refrigerant in refrigerant tank 14 circulates in the main circuit, thus improving the defrosting performance. When returning to the heating mode from the defrosting mode, the refrigerant recovery operation is performed to recover an excess of the refrigerant for the heating mode to refrigerant tank 14.

In the first embodiment, when pressure Pout at the high-pressure side reaches an upper limit pressure value Pmax during the refrigerant recovery operation, controller 20 stops the refrigerant recovery operation in order to prevent failure of refrigeration cycle apparatus 1. Moreover, when pressure Pin at the low-pressure side reaches a lower limit pressure value Pmin during the refrigerant recovery operation, controller 20 stops the refrigerant recovery operation in order to prevent the water flowing in water circuit 16 from being frozen. In FIG. 7, upper limit temperature value Tmax is a high-pressure saturation temperature corresponding to upper limit pressure value Pmax. Lower limit temperature value Tmin is a low-pressure saturation temperature corresponding to lower limit pressure value Pmin.

As shown in FIG. 6, in the refrigerant recovery operation, second decompressor 13 and valve 15 are controlled to be in the open state. Flow path switch 3 maintains the discharge side of compressor 2 to be connected to first heat exchanger 4. The control of first decompressor 5 for the degree of superheat is continued. Blower 11 is feedback-controlled to cause the high-pressure saturation temperature to be close to target temperature value T2. Compressor 2 is feedback-controlled to cause the low-pressure saturation temperature to be close to target temperature value T1.

As shown in FIG. 10, by opening second decompressor 13 and valve 15 in refrigerant tank circuit 12, the refrigerant flowing from first heat exchanger 4 is branched at an upstream of first decompressor 5, is decompressed by second decompressor 13 into liquid refrigerant, and is stored in refrigerant tank 14. Mainly, the gas refrigerant of the circulating refrigerant flows out from refrigerant tank 14 and flows toward second heat exchanger 6 via valve 15.

When the refrigerant recovery operation is started, the feedback control shown in FIG. 11 by controller 20 is started. In a step S31, controller 20 determines whether or not the refrigerant recovery operation should be stopped. Examples of the case where the refrigerant recovery operation should be stopped includes: a case where pressure Pout at the high-pressure side reaches upper limit pressure value Pmax (point J2 in FIG. 7), or a case where pressure Pin at the low-pressure side reaches lower limit pressure value Pmin (point J1 in FIG. 7). In the case where the refrigerant recovery operation should be stopped (YES in S31), controller 20 ends the refrigerant recovery operation. In the case where the refrigerant recovery operation can be continued (NO in S31), controller 20 performs feedback control (steps S32 and S33) of compressor 2 and feedback control (steps S34 and S35) of blower 11 in parallel.

In S32, controller 20 determines whether or not the absolute value of a difference between pressure Pin at the low-pressure side and low-pressure side target pressure value P1 is less than a threshold value V1. When the absolute value of the difference between pressure Pin and low-pressure side target pressure value P1 is less than threshold value V1 (YES in S32), controller 20 waits for end of the feedback control of blower 11. When the absolute value of the difference between pressure Pin and low-pressure side target pressure value P1 is more than or equal to threshold value V1 (NO in S32), controller 20 brings the process to a step S33. In S33, controller 20 controls the driving frequency of compressor 2 to cause the absolute value of the difference between pressure Pin and low-pressure side target pressure value P1 to be less than threshold value V1, and then waits for end of the feedback control of blower 11.

In S34, controller 20 determines whether or not the absolute value of the difference between pressure Pout at the high-pressure side and high-pressure side target pressure value P2 is less than threshold value V2. When the absolute value of the difference between pressure Pout and high-pressure side target pressure value P2 is less than threshold value V2 (YES in S34), controller 20 waits for end of the feedback control of compressor 2. When the absolute value of the difference between pressure Pout at the high-pressure side and high-pressure side target pressure value P2 is more than or equal to threshold value V2 (NO in S34), controller 20 brings the process to step S35. In S35, controller 20 controls the rotating speed of fan 111 to cause the absolute value of the difference between pressure Pout and high-pressure side target pressure value P2 to be less than threshold value V2, then ends the feedback control of blower 11, and waits for end of the feedback control of compressor 2.

When the respective feedback controls of compressor 2 and blower 11 are ended, controller 20 brings the process to a step S36. In S36, controller 20 determines whether or not the refrigerant recovery is completed. Whether or not the refrigerant recovery is completed is determined by determining whether or not the amount of the refrigerant in the refrigerant tank is more than or equal to a threshold value. It will be explained later how the amount of the refrigerant in the refrigerant tank is detected. When the refrigerant recovery is completed (YES in S36), controller 20 ends the refrigerant recovery operation. When the refrigerant recovery is not completed (NO in S36), controller 20 returns the process to S31, and repeats the process mentioned above.

When refrigerant tank 14 is brought into the liquid-filled state as a result of the refrigerant recovery operation, the liquid refrigerant flows to the downstream of second heat exchanger 6, with the result that the degree of superheat at the suction side of compressor 2 starts to be decreased as indicated by a period from a point H to a point I in FIG. 7. When the degree of superheat at the suction side of compressor 2 is decreased due to this phenomenon to a threshold value SH3, which is a threshold value for determining whether or not the recovery is completed, as indicated by point I in FIG. 7, controller 20 determines that refrigerant tank 14 is in the liquid-filled state, i.e., determines that the refrigerant recovery operation is completed, and ends the refrigerant recovery operation.

It should be noted that FIG. 6 shows the example in which the defrosting continuing operation is performed between the refrigerant releasing operation and the refrigerant recovery operation. Depending on the amount of frost adhered to first heat exchanger 4, all the frost may be melted during the refrigerant releasing operation. When it is detected that the high-pressure saturation temperature reaches target temperature value T2, which is the threshold value for determining to end the defrosting, during the refrigerant releasing operation, controller 20 stops the refrigerant releasing operation and transitions to the refrigerant recovery operation.

<Resumption of Heating Mode>

As shown in FIG. 6, when the defrosting mode is ended, the heating mode is resumed. Since second heat exchanger 6 serving as the use-side heat exchanger has been cooled during the defrosting mode, compressor 2 is generally operated with high operation performance when the heating mode is resumed. The discharge side of compressor 2 is connected to second heat exchanger 6 by flow path switch 3. The control of first decompressor 5 for the degree of superheat is continued. Second decompressor 13 of refrigerant tank circuit 12 has a degree of opening corresponding to the fully close state or substantially fully close state, and valve 15 is in the open state.

As described above, in the first embodiment, during the refrigerant recovery operation, controller 20 performs feedback control to cause pressure Pout to be close to high-pressure side target pressure value P2 by rotating fan 111 while monitoring pressure Pout at the high-pressure side. By performing such feedback control, the pressure of the refrigerant at the high-pressure side can be suppressed from being increased. Accordingly, the refrigerant recovery operation can be performed in a longer time than that in the conventional case, whereby the amount of recovery of the refrigerant can be increased. As a result, accumulator 7 can be downsized and refrigeration cycle apparatus 1 can be downsized.

Moreover, in the first embodiment, by controlling the driving frequency of compressor 2 while monitoring pressure Pin at the low-pressure side during the refrigerant recovery operation, controller 20 performs feedback control to cause pressure Pin to be close to low-pressure side target pressure value P1. By performing such feedback control, the temperature of the refrigerant at the low-pressure side can be suppressed from being decreased. Accordingly, the refrigerant recovery operation can be performed for a longer time than that in the conventional case, whereby the amount of recovery of the refrigerant can be increased. As a result, accumulator 7 can be downsized and refrigeration cycle apparatus 1 can be downsized.

Further, according to the first embodiment, by performing the feedback control for both compressor 2 and blower 11 during the refrigerant recovery operation, the refrigerant recovery operation can be stably continued until the excess of the refrigerant is sufficiently recovered during the refrigerant recovery operation. As a result, accumulator 7 can be further downsized and refrigeration cycle apparatus 1 can be further downsized.

Further, according to the first embodiment, since air is blown to first heat exchanger 4 by rotating fan 111 during the refrigerant recovery operation, water resulting from the melted frost can be blown off in the defrosting mode. As a result, the operating efficiency of refrigeration cycle apparatus 1 in the heating mode performed after the refrigerant recovery operation can be increased.

Second Embodiment

In the first embodiment, it has been illustrated that the feedback control is performed for both compressor 2 and blower 11 during the refrigerant recovery operation. One of compressor 2 and blower 11 may be feedback-controlled during the refrigerant recovery operation. In the second embodiment, the following describes a case where feedback control is performed for one of compressor 2 and blower 11 during the refrigerant recovery operation.

A difference of the second embodiment from the first embodiment lies in that the feedback control is performed for one of compressor 2 and blower 11 during the refrigerant recovery operation. That is, in the second embodiment, FIG. 11 shown in FIG. 11 in the first embodiment is replaced with the flowchart shown in FIG. 12 or FIG. 13. Points other than this are the same as those in the first embodiment, and therefore will not be described repeatedly.

Figure 12:
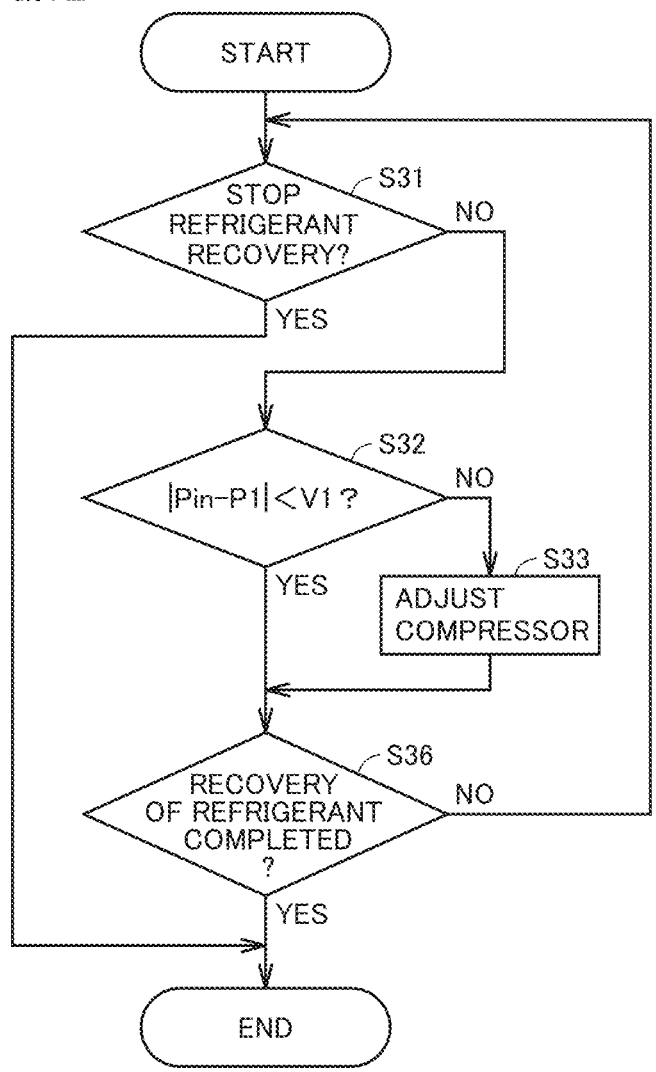
FIG. 12 is a flowchart in the case where feedback control is performed for a compressor during the refrigerant recovery operation.

FIG. 12 is a flowchart in the case where the feedback control is performed for compressor 2 during the refrigerant recovery operation. As shown in FIG. 12, when the refrigerant recovery operation is continued (NO in S31), controller 20 performs feedback control for compressor 2 (steps S32 and S33).

By controlling the driving frequency of compressor 2 while monitoring pressure Pin at the low-pressure side during the refrigerant recovery operation, the feedback control is performed to cause pressure Pin to be close to low-pressure side target pressure value P1. By performing such feedback control, the temperature of the refrigerant at the low-pressure side can be suppressed from being decreased. Accordingly, the refrigerant recovery operation can be performed for a longer time than that in the conventional case, whereby the amount of recovery of the refrigerant can be increased. As a result, accumulator 7 can be downsized and the refrigeration cycle apparatus according to the second embodiment can be downsized.

Figure 13:
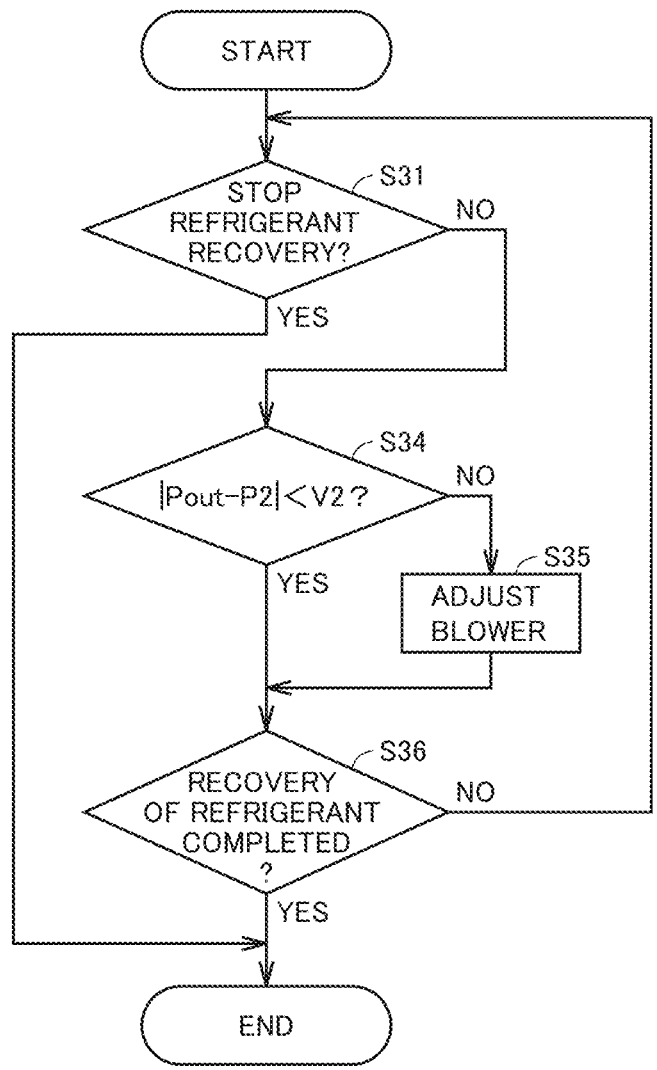
FIG. 13 is a flowchart in the case where feedback control is performed for a blower during the refrigerant recovery operation.

FIG. 13 is a flowchart in the case where the feedback control is performed for blower 11 during the refrigerant recovery operation. As shown in FIG. 13, when the refrigerant recovery operation should be continued (NO in S31), controller 20 performs the feedback control (steps S34 and S35) of blower 11.

By rotating fan 111 while monitoring pressure Pout at the high-pressure side during the refrigerant recovery operation, controller 20 performs the feedback control to cause pressure Pout to be close to high-pressure side target pressure value P2. By performing such feedback control, the pressure of the refrigerant at the high-pressure side can be suppressed from being increased. Accordingly, the refrigerant recovery operation is performed for a longer time than that in the conventional case, whereby the amount of recovery of the refrigerant can be increased. As a result, accumulator 7 becomes unnecessary or can be downsized, whereby the refrigeration cycle apparatus according to the second embodiment can be downsized.

Further, when the feedback control is performed for blower 11 during the refrigerant recovery operation, air is sent to first heat exchanger 4 by rotating fan 111 during the refrigerant recovery operation. Hence, water resulting from melted frost can be blown off in the defrosting mode. As a result, the operating efficiency of the refrigeration cycle apparatus in the heating mode can be increased.

[Modification]

(1) Exemplary Detection of Liquid Amount in Refrigerant Tank

While the amount of the liquid refrigerant in refrigerant tank 14 can be detected based on the degree of superheat at the suction side of compressor 2, there are also the following means for detecting the amount of the liquid refrigerant in refrigerant tank 14.

Figure 14:
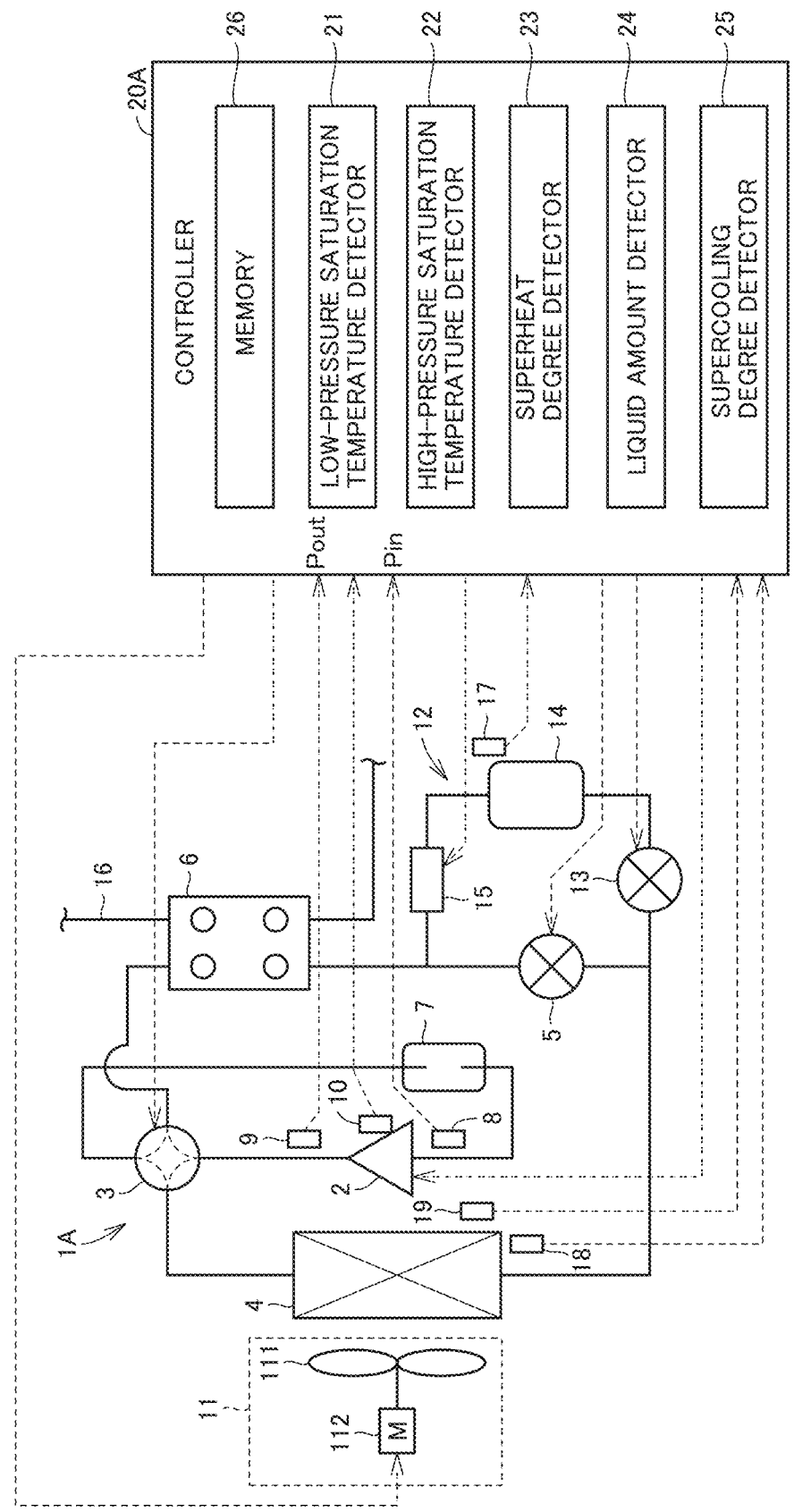
FIG. 14 shows both a circuit configuration diagram of a refrigeration cycle apparatus according to a modification of the first embodiment and a function block diagram of a controller.

FIG. 14 shows both a circuit configuration diagram of a refrigeration cycle apparatus 1A according to a modification of the first and second embodiments and a function block diagram of a controller 20A. Refrigeration cycle apparatus 1A according to the modification further includes a liquid amount detection device 17. Moreover, controller 20A further includes a liquid amount detector 24 and a supercooling degree detector 25.

Liquid amount detector 24 is configured to detect the amount of the liquid refrigerant in refrigerant tank 14 based on information received from liquid amount detection device 17.

Supercooling degree detector 25 is configured to detect the saturation temperature of the refrigerant at the discharge side in accordance with the pressure of the refrigerant detected by second discharge pressure sensor 18 at the discharge side of first heat exchanger 4 and the conversion table of the saturation temperatures under various pressures in memory 26. Supercooling degree detector 25 is configured to detect the degree of supercooling at the outlet of first heat exchanger 4 by determining a difference between the detected saturation temperature and the refrigerant temperature detected by discharge temperature sensor 19 at the outlet of first heat exchanger 4.

(1-1) Timer

An exemplary liquid amount detection device 17 is a timer. Liquid amount detector 24 is configured to count an elapsed time of the refrigerant recovery operation (one or both of the first refrigerant recovery operation and the second refrigerant recovery operation) based on the measurement time received from the timer. When the elapsed time of the refrigerant recovery operation reaches a threshold value, liquid amount detector 24 is configured to determine that refrigerant tank 14 is in the liquid-filled state. The threshold value for the elapsed time of the refrigerant recovery operation can be determined by way of an actual experiment or simulation, for example.

(1-2) Liquid Level Sensor

Another exemplary liquid amount detection device 17 is a liquid level sensor configured to detect a liquid level. A specific example of the liquid level sensor is a float sensor provided in refrigerant tank 14. Another specific example of the liquid level sensor is an ultrasonic sensor. Still another specific example of the liquid level sensor is a plurality of temperature sensors, such as heat resistance detectors, installed at a side surface of refrigerant tank 14 in the height direction. A liquid level is detected based on a difference between detection values of the plurality of temperature sensors. It should be noted that the specific examples of the liquid level sensor are not limited to those listed herein.

(1-3) Sound Collecting Sensor

Still another exemplary liquid amount detection device 17 is a sound collecting sensors provided at valve 15. Based on a sound pressure level (dB) received from the sound collecting sensor, liquid amount detector 24 is configured to determine whether or not refrigerant tank 14 is in the liquid-filled state.

Upon starting the refrigerant recovery operation, the liquid refrigerant is hardly stored in refrigerant tank 14. Accordingly, upon starting the refrigerant recovery operation, the gas refrigerant passes through valve 15. As the refrigerant recovery operation is continued, the liquid refrigerant starts to be accumulated in refrigerant tank 14. When refrigerant tank 14 is brought into the liquid-filled state, the liquid refrigerant flowing out from refrigerant tank 14 starts to pass through valve 15. Values of the sound pressure level (dB) differ between the case where the gas refrigerant passes through valve 15 and the case where the liquid refrigerant passes through valve 15. The sound pressure level (dB) in the case where the liquid refrigerant passes is lower than the sound pressure level (dB) in the case where the gas refrigerant passes. By determining whether or not the sound pressure level (dB) received from the sound collecting sensor is decreased to a threshold value, liquid amount detector 24 can determine whether or not refrigerant tank 14 is in the liquid-filled state.

(1-4) Degree of Supercooling

When refrigerant tank 14 in brought into the liquid-filled state as a result of the refrigerant recovery operation, a degree of supercooling at the discharge side of the first heat exchanger starts to be decreased. When the degree of supercooling at the discharge side is decreased due to this phenomenon to a threshold value for determining the completion of the recovery, controller 20 can determine that refrigerant tank 14 is in the liquid-filled state, i.e., the refrigerant recovery operation is completed.

(2) Presence/Absence of Degassing Pipe

Figure 15:
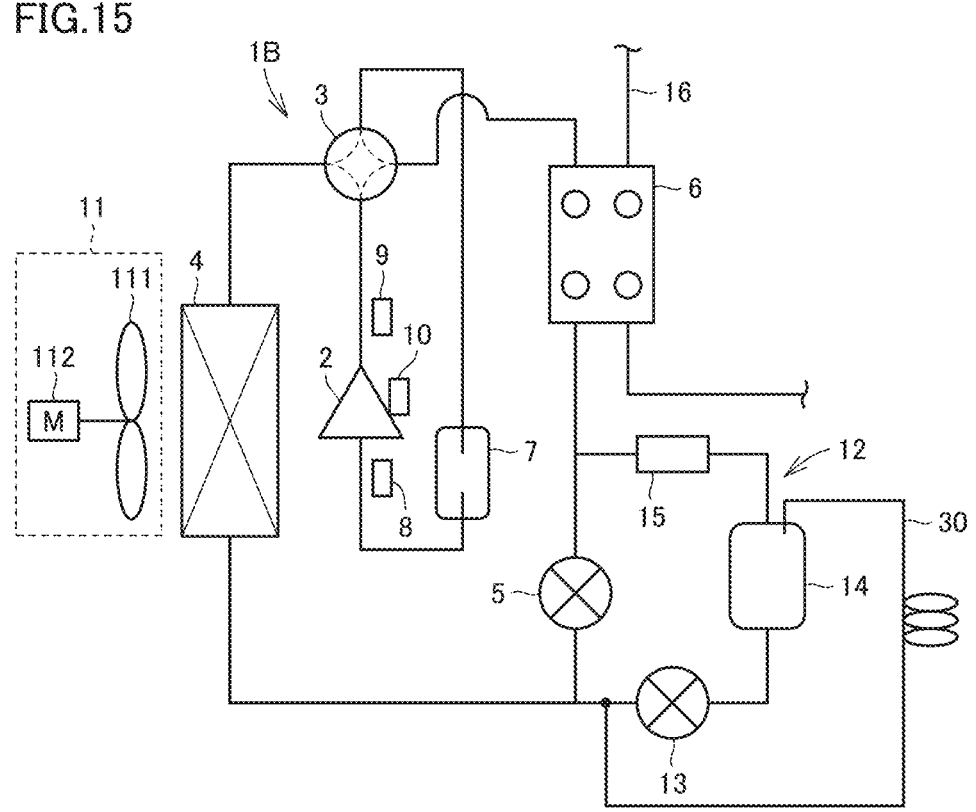
FIG. 15 is a circuit configuration diagram of a refrigeration cycle apparatus according to an embodiment in which a degassing pipe is provided.

The refrigeration cycle apparatus according to each of the embodiments may include a degassing pipe configured to discharge the gas refrigerant from refrigerant tank 14. For example, as in a refrigeration cycle apparatus 1B shown in FIG. 15, a degassing pipe may be provided to extend from refrigerant tank 14 to the main circuit side of second decompressor 13. With such a configuration, the liquid refrigerant can be recovered to fill refrigerant tank 14 even when the gas-liquid, two-phase refrigerant flows into refrigerant tank 14 in the refrigerant recovery operation.

The embodiments disclosed herein are expected to be implemented in an appropriate combination. The embodiments disclosed herein are illustrative and non-restrictive in any respect. The scope of the present invention is defined by the terms of the claims, rather than the embodiments described above, and is intended to include any modifications within the scope and meaning equivalent to the terms of the claims.

REFERENCE SIGNS LIST 1, 1A, 1B: refrigeration cycle apparatus; 2: compressor; 3: flow path switch; 4: first heat exchanger; 5: first decompressor; 6: second heat exchanger; 7: accumulator; 8: suction pressure sensor; 9: first discharge pressure sensor; 10: suction temperature sensor; 11: blower; 12: refrigerant tank circuit; 13: second decompressor; 14: refrigerant tank; 15: valve; 16: water circuit; 17: liquid amount detection device; 18: second discharge pressure sensor; 19: discharge temperature sensor; 20, 20A: controller; 21: low-pressure saturation temperature detector; 22: high-pressure saturation temperature detector; 23: superheat degree detector; 24: refrigerant tank liquid amount detector; 25: supercooling degree detector; 26: memory; 100: air cooling type heat pump chiller; 111: fan; 112: motor; P1: low-pressure side target pressure value; P2: high-pressure side target pressure value; Pmax: upper limit pressure value; Pmin: lower limit pressure value; Pin, Pout: pressure; V1, V2: threshold value.

The invention claimed is:

1. A refrigeration cycle apparatus comprising:
a first heat exchanger having a first heat exchanging capacity;
a second heat exchanger having a second heat exchanging capacity smaller than the first heat exchanging capacity of the first heat exchanger;
a compressor;
a decompressor;
a flow path switch configured to form a flow path in which refrigerant circulates in a first circulation direction in order of the first heat exchanger, the decompressor, the second heat exchanger, and the compressor, or in a second circulation direction reverse to the first circulation direction;
a blower configured to blow air to the first heat exchanger;
a refrigerant tank circuit having a refrigerant tank and connected to the flow path; and
a controller configured to switch an operation mode including a heating mode and a defrosting mode, the defrosting mode including a refrigerant recovery operation,
in the heating mode, the flow path switch being controlled to form the flow path in which the refrigerant circulates in the second circulation direction,
in the defrosting mode, the flow path switch being controlled to form the flow path in which the refrigerant circulates in the first circulation direction and the refrigerant tank circuit being controlled to release the refrigerant from the refrigerant tank to the flow path,
when the operation mode is switched from the defrosting mode to the heating mode, the refrigerant recovery operation being performed to recover the refrigerant to the refrigerant tank while circulating the refrigerant in the first circulation direction, and the blower being operated during the refrigerant recovery operation.

2. The refrigeration cycle apparatus according to claim 1, wherein when a first absolute value of a difference between a pressure of the refrigerant at a discharge side of the compressor and a first target pressure value becomes more than a first threshold value during the refrigerant recovery operation, an amount of air blown from the blower is controlled to cause the first absolute value to be less than the first threshold value.

3. The refrigeration cycle apparatus according to claim 2, wherein when a second absolute value of a difference between a pressure of the refrigerant at a suction side of the compressor and a second target pressure value becomes more than a second threshold value during the refrigerant recovery operation, a driving frequency of the compressor is controlled to cause the second absolute value to be less than the second threshold value.

4. The refrigeration cycle apparatus according to claim 3, wherein when the pressure at the discharge side of the compressor reaches an upper limit pressure value or the pressure of the refrigerant at the suction side of the compressor reaches a lower limit value during the refrigerant recovery operation, the refrigerant recovery operation is stopped.

5. The refrigeration cycle apparatus according to claim 1, wherein the refrigerant recovery operation is ended based on an amount of the refrigerant in the refrigerant tank, the amount of the refrigerant being detected based on a degree of supercooling at a discharge side of the first heat exchanger.

6. The refrigeration cycle apparatus according to claim 1, wherein the refrigerant recovery operation is ended based on an amount of the refrigerant in the refrigerant tank, the amount of the refrigerant being detected based on a degree of superheat at a suction side of the compressor.

7. The refrigeration cycle apparatus according to claim 1, further comprising a liquid amount detection device configured to detect an amount of the refrigerant in the refrigerant tank, wherein
   the refrigerant recovery operation is ended based on an amount of the refrigerant in the refrigerant tank, the amount of the refrigerant being detected by the liquid amount detection device.

8. The refrigeration cycle apparatus according to claim 7, wherein
   the liquid amount detection device comprises a timer, and
   the amount of the refrigerant in the refrigerant tank is detected based on a measurement time of the timer.

9. The refrigeration cycle apparatus according to claim 7, wherein
   the liquid amount detection device comprises a liquid level sensor configured to detect a liquid level in the refrigerant tank, and
   the amount of the refrigerant in the refrigerant tank is detected based on a detection value detected by the liquid level sensor.

10. The refrigeration cycle apparatus according to claim 7, wherein
    the liquid amount detection device comprises a sound collecting sensor configured to be attached to the refrigerant tank, and
    the amount of the refrigerant in the refrigerant tank is detected based on a sound pressure level detected by the sound collecting sensor.

* * * * *